Sept. 8, 1953　　　D. A. WALKER　　　2,651,161
COTTON PICKER SPINDLE
Filed April 3, 1951　　　2 Sheets-Sheet 2
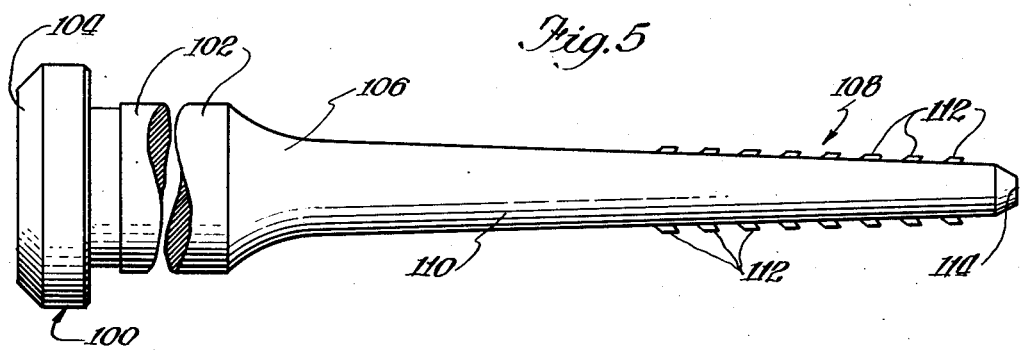
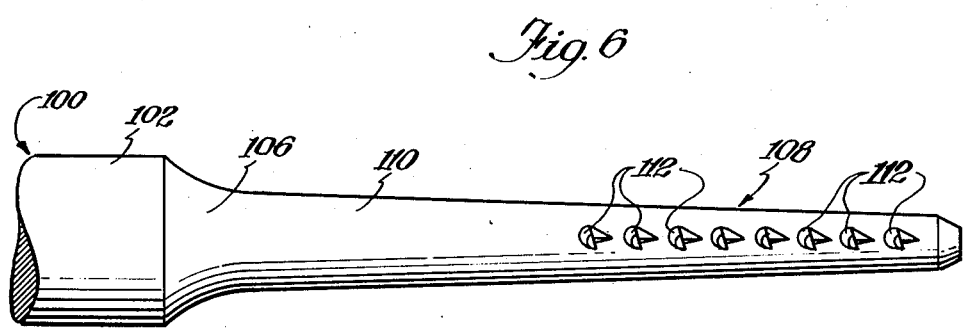
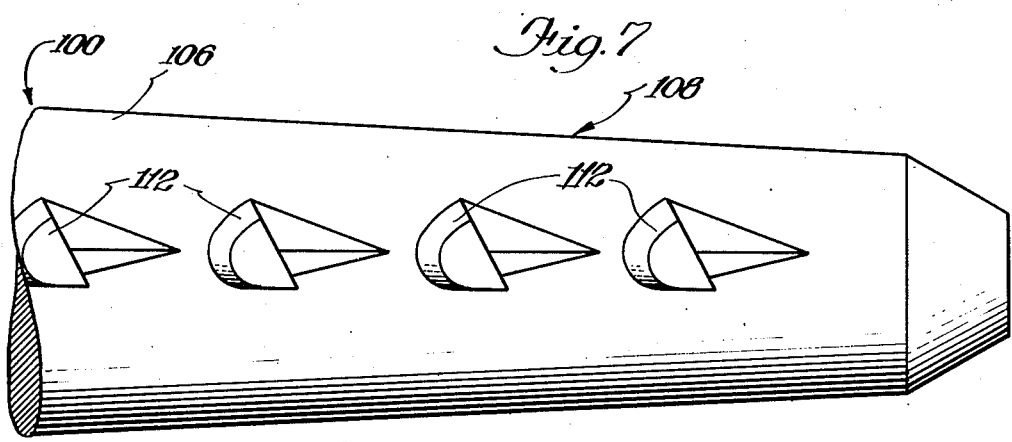
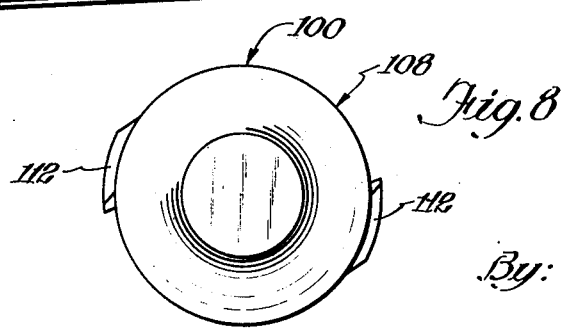
Inventor:
Delos A. Walker
By: Paul O. Pippel
Attorney Patented Sept. 8, 1953

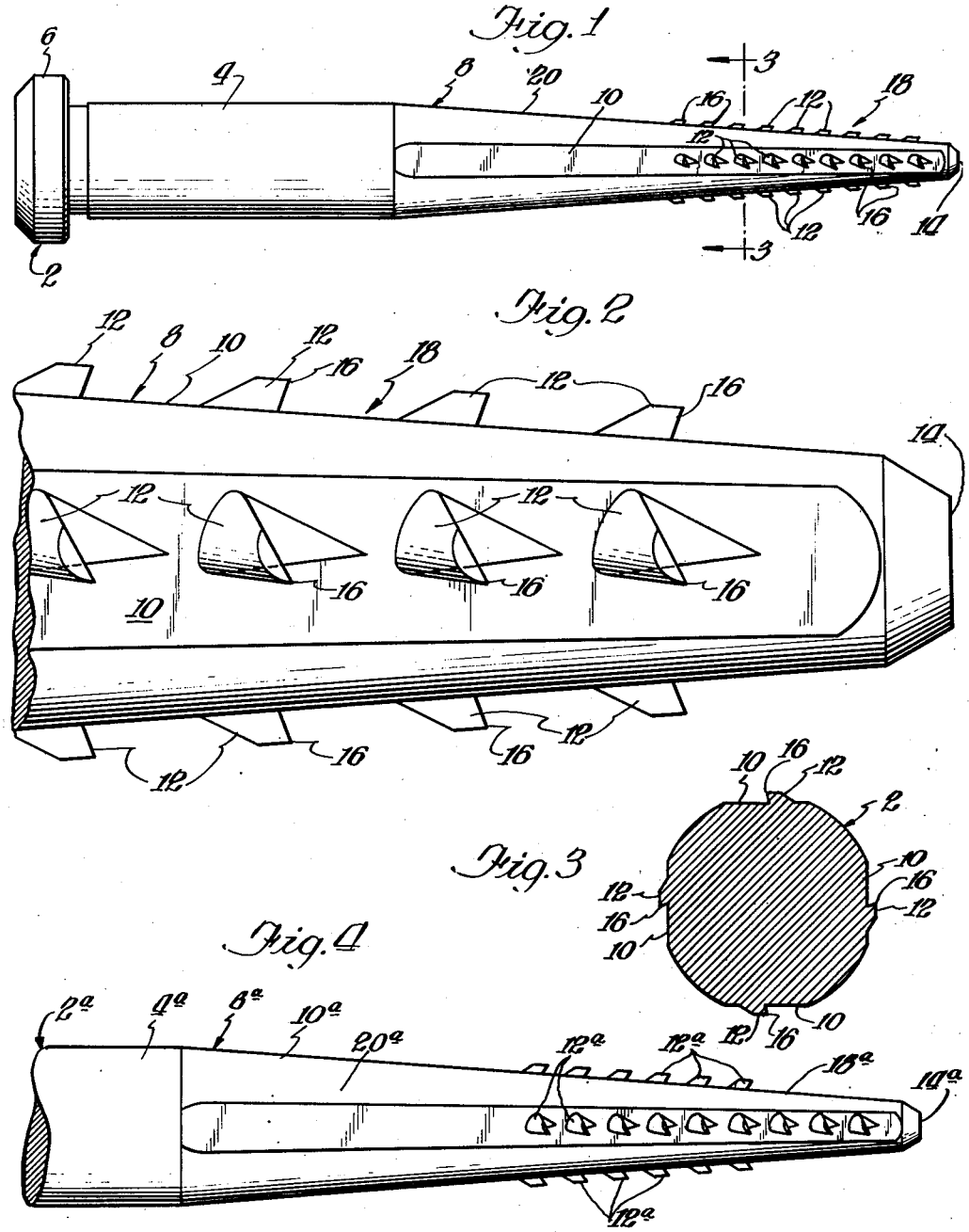

2,651,161

UNITED STATES PATENT OFFICE 2,651,161

COTTON PICKER SPINDLE

Delos A. Walker, Memphis, Tenn., assignor to International Harvester Company, a corporation of New Jersey Application April 3, 1951, Serial No. 218,923

11 Claims. (Cl. 56—50)

1

This invention relates to cotton picker spindles and more particularly to a type incorporating a plurality of barbs adapted to snag seed cotton and entwine it on the spindle pursuant to its rotation.

Past constructions feature spindles having a plant-entering-portion with a plurality of barbs spaced along the entire length thereof on the theory that snagging of the lint at intervals all along the full length of the plant-entering-portion of the spindle in addition to winding the fibers on this portion was absolutely necessary to insure maximum picking and prevent the cotton from being stripped off by the plant when the laden spindle is withdrawn therefrom.

An ideal picker unit envisages the characteristics of having just sufficient aggressiveness to picking a maximum amount of cotton without injury to the plant, retaining the cotton when being withdrawn from the plant, and yet possessing the quality of readily shedding the cotton when subjected to the doffing mechanism.

Such characteristics have not been realized in the constructions described. The extensive snagging areas of the picker portions of these spindles materially increases the resistance of the picker to shedding in the doffer station inasmuch as the fibers must be broken away or disengaged from the barbs all along the length of the spindles while being swept therefrom by the doffers.

As a result, the doffers are, as a rule, arranged to press tightly against the lint and frequently are adjusted to bear against the spindles in order to doff effectively. The extensive sharp surface over which the doffers brush under pressure accelerates their wear as well as that of the spindles and also increases the power requirements. The provision of such a large number of barbs is costly and furthermore augments the aggressiveness of the spindle in not only picking seed cotton but also breaking off green bolls and picking trash. The excessive number of barbs over the entire area of the plant entering portion proportionately increases the possibilities of seriously injuring the plant.

The principal object of the invention is to provide picker spindles which generally obviate the disadvantages incident to those heretofore available.

A further object is to devise spindles which possess a minimum number of barbs strategically located to effectively snag the cotton and to retain it on the spindle while it is being extracted from the plant and advanced to the doffer station and to minimize their resistance to doffing by the doffing means.

2

A different object is to devise a spindle with barbs positioned only adjacent to the outer end of the plant-entering-portion of the spindle whereby as the portion begins to enter the plant, the cotton is caught in the barbs so that the sharp portion of the spindle is quickly wrapped in the soft cotton as the spindle is moved further into the plant. This feature affords maximum protection to the plant and at least in part utilizes the texture of the lint on the spindle to provide tentacles adapted to further accrete on the spindle any contacting lint on the plant whereby maximum picking is effected.

A more specific object is to provide a spindle having a conical picking portion with barbs disposed only adjacent to the pointed outer extremity thereof, the remainder of the portion inwardly of the barbed area being of relatively smooth generally conical contour to afford a winding region for the cotton such as may be stretched from the barbed area or which may accrete to the initial winding of cotton as it bunches on the spindle during penetration thereof into the plant.

The provisions of barbs only at the small end of the conical picker portion facilitates doffing of the spindle inasmuch as the fibers on the smooth portion will easily wipe over that on the small end and will be pulled off therewith from the spindle with minimum resistance.

In two embodiments of the invention the picker portion is shown relatively thick with four rows of barbs; in one the rows being of substantially equal length and in the other two alternate rows being shorter than the remaining two. These types of spindles are particularly well suited for picking long staple cotton or for use in a plant of low density to cover a large area of the plant. The one with more barbs is more aggressive and the other relatively easier to doff.

The third embodiment features a relatively thin conical picker section with two diametrically oppositely arranged rows of barbs extending from the outer end of the section to adjacent the center thereof. This embodiment is especially adaptable for dense plants or for short staple cotton.

It will be understood, however, that any of the three types shown will perform in satisfactory manner in any type of plant and that various modifications thereof will be readily apparent.

These and other objects of the invention will become more apparent from the specification and the drawings, wherein:

Figure 1 is a side elevational view of one form of picker spindle incorporating the invention.

Figure 2 is a fragmentary enlarged view thereof, and

Figure 3 is an enlarged radial sectional view thereof taken substantially on the line 3—3 of Figure 1.

Figure 4 is a fragmentary side elevational view of another embodiment of the invention.

Figures 5 through 8, illustrate a further embodiment of the invention, Figure 5 being a side elevational view of the spindle, Figure 6 being a fragmentary side elevational view rotated 90° with respect to Figure 5, Figure 7 being a fragmentary enlarged view of the end portion of Figure 6 and, Figure 8 being an end view of the portion of the spindle shown in Figure 7.

Describing the invention in detail, and referring first to the embodiment shown in the Figures 1 through 3, the spindle generally indicated 2 comprises a cylindrical shank 4 at one end, said shank affording a journal area for rotatably supporting the spindle and having a gear 6 formed preferably integral with its inner end. The outer end of the shank merges into the inner extremity or large base end of a conical picker portion or plant-entering-segment 8. It will be seen that in this design the base end of the conical portion 8 is substantially co-dimensional radially with the cylindrical portion 4. The portion 8 is in the form of a regular geometrical cone and is provided with four flat facets 10, disposed at approximately 90° intervals around the circumference of the portion 8. On each facet 10, there are formed a plurality of barbs or cotton-retaining means 12 arranged in a row longitudinally of the spindle and extending from adjacent the outer tip of portion 8 to a point adjacent to the center of portion 8. In this construction, the portion 8 may have a length of $5\frac{1}{32}$ inches and each row may commence with the first barb spaced $\frac{7}{32}$ of an inch inwardly from the outer tip or first plant-entering apex end 14 of the spindle and the barbs may be spaced equally within a length of about $1\frac{5}{16}$ of an inch from the forward tip of the first barb to the forward tip of the last. The barbs may be of a design such as shown in U. S. Patent 2,290,222. Each barb extends radially outwardly of the associated facet 10 and has a radially outer pointed end 16 which is directed angularly toward the axis of the spindle toward the outer end thereof in the direction of rotation of the spindle.

It will be seen that the barbed region generally indicated 18 is disposed adjacent to the outer extremity of the portion 8 at its small end and that inwardly of the region 18, the portion 8 provides a relatively smooth region or area 20. The zone 18 forms a snagging section for catching the cotton and winding the cotton thereon and the smooth contour of region 20 affords a winding section for wrapping the cotton thereon.

In operation, the spindle 2 while rotating, enters with its point 14 into the plant. Immediately upon its entry, the barbs 12 snag the adjacent cotton and wrap the cotton around the zone 18, while the spindle continues to penetrate into the plant. The fibers on the zone 18 may be elongated or stretched over the zone 20. Any other fibers in contact with that already disposed on the spindle may accrete thereto and wind about the spindle. As the spindle is being withdrawn from the plant the cotton on the zone 20, if caught in the plant, will tend to slide off toward the zone 18, however, the cotton which is snagged on the barbs 12 will prevent the cotton on zone 20 from being removed from the spindle so that the caught cotton on zone 20 will generally break away from the plant and remain on the spindle. When the spindle is advanced to the doffing station, the doffers, which have a more positive wiping action, will readily pull the lint on zone 20 against or over the lint on zone 18 and sweep and unwind the entire wad of cotton off the spindle with comparative ease.

Referring now to the embodiment shown in Figure 4, it will be seen that the picker spindle generally designated 2a is substantially of the same form as the spindle 2 and comprises a cylindrical shank or journal portion 4a which at its inner end is provided with a driving gear (not shown) and at its outer end merges into the base of the conical picker or plant-entering-portion 10a which forms the outer extremity of the spindle 2a. The construction of the portion 8a is identical with that of portion 8. In the present modification parts which are identical with those of the previous embodiment are identified with corresponding reference numerals with the addition of suffix a. Portion 8a differs from portion 8 in that the former is provided with two diametrically opposite rows of barbs or cotton-retaining means 12a, each comprising nine barbs and the two other diametrically opposite rows which comprise six barbs each. The rows with the nine barbs each commence approximately $\frac{7}{32}$ of an inch inwardly from the tip 14a and terminate adjacent to the center of the portion 10a. These last-mentioned barbs are equally spaced within a distance longitudinally of a spindle of approximately $1\frac{5}{16}$ of an inch from the leading end of the first barb to the leading end of the last. The rows with the six barbs each initiate in circumferential alignment with the fourth barbs of the nine barb rows and terminate at their sixth barbs in circumferential alignment with the ninth barbs.

Referring now to the embodiment shown in Figures 5 through 8, the spindle generally designated 100 is in general similar as that shown in the previous embodiments of the invention and comprises a cylindrical shank 102 provided with a drive gear 104 at its inner end, the outer end of the shank 102 merging into the inner end of a plant-entering or picker portion 106 of the spindle, said portion 106 being of reduced diameter with respect to the portion 102. The portion 106 is of conical form and comprises a barbed outer end section 108 and inwardly thereof a smooth frusto-conical section 110. The barbed section 108 comprises two diametrically opposite rows of eight barbs or cotton-retaining means 112 each. Each barb 112 is of substantially the same form as barbs 12 and 12a but of slightly less radial extent and is formed directly on the conical contour of the portion 106. The radial extent of each barb 112 outwardly to the periphery of the cone is approximately the same as that of barbs 12 and 12a. Each row preferably commences at a point $\frac{7}{32}$ of an inch inwardly of the outer tip extremity 114 of the spindle and extends to intermediate the ends of the portion 106 and has a length similar to that of the previous embodiments. This type of spindle has good doffing characteristics and its thin plant entering portion is particularly desirable in dense plants.

Spindles made in accordance with this invention have been actually tested to match their performance against the conventional spindles having their entire picking portion barbed, and have been found to perform satisfactorily with the added advantages of minimizing plant injury, providing good doffing characteristics, increasing the life of the doffers and decreasing the cost not

What is claimed is:

1. A cotton picker spindle having a shank portion and a plant entering section tapered from said shank portion toward an outer tip, said section including at least one row of cotton-retaining means extending from a point adjacent to its said tip and terminating at a point substantially midway of the length of said section.

2. A cotton picker spindle having a shank portion and a plant entering section tapered from said shank portion toward an outer tip, said section including a plurality of rows of cotton-retaining means extending from a point adjacent said tip and terminating at a point substantially midway of the length of said section.

3. A cotton picker spindle according to claim 2 and said rows disposed at diametrically opposite sides of said section and each comprising a series of barbs.

4. A cotton picker spindle according to claim 2 and said plurality of rows comprising four spaced at 90° intervals about the principal axis of the spindle.

5. A cotton picker spindle according to claim 2 and each row comprising a series of barbs spaced longitudinally of the spindle and said rows spaced circumferentially about said section and certain of said rows commencing in close proximity to the tip and the other of said rows commencing at a substantial distance from said tip.

6. A cotton picker spindle according to claim 2 and each row comprising a series of barbs spaced longitudinally of the spindle, certain of said rows being longer than the other of said rows.

7. A cotton picker spindle according to claim 2 and said section being generally conical and including a plurality of circumferentially spaced flat peripheral facets extending lengthwise from said tip to said shank portion, and said rows of cotton-retaining means comprising barbs projecting from said facets.

8. A cotton picker spindle having a shank portion and a plant entering section tapered from said shank portion toward an outer tip, said section including at least one row of cotton-retaining means extending from a point adjacent said tip and terminating at a point substantially midway of the length of said section, said section having a substantially conical periphery and being of small diameter substantially lesser than that of said shank portion.

9. A cotton picker spindle according to claim 8 and said cotton-retaining means comprising barbs on the conical periphery of said section and projecting radially outwardly from said periphery.

10. A cotton picker spindle having a shank portion and a plant entering section tapered from said shank portion toward an outer tip, said section including a substantially flat facet and a row of cotton-retaining means on the facet extending from a point adjacent said tip and terminating at a point substantially midway of the length of said section, said cotton-retaining means comprising barbs projecting radially outwardly of said facet.

11. A cotton picker spindle according to claim 10 and said section being in the form of a regular cone and having a base diameter substantially that of said shank portion.

DELOS A. WALKER.

References Cited in the file of this patent

UNITED STATES PATENTS

| Number | Name | Date |
|---|---|---|
| 2,440,767 | Baker | May 4, 1948 |
| 2,497,776 | Kallgren | Feb. 14, 1950 |